US006281290B1

(12) United States Patent
Klosiewicz

(10) Patent No.: US 6,281,290 B1
(45) Date of Patent: Aug. 28, 2001

(54) COMPOSITIONS, PROCESSES FOR MAKING, AND ARTICLES OF POLYOLEFINS, HIGH DENSITY POLYETHYLENE AND HYDROCARBON RESIN

(75) Inventor: Daniel W. Klosiewicz, Newark, DE (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/511,871

(22) Filed: Feb. 25, 2000

Related U.S. Application Data

(62) Division of application No. 08/618,756, filed on Mar. 20, 1996, now Pat. No. 6,087,446.

(51) Int. Cl.$^7$ .............................. C08L 23/10; C08J 3/22
(52) U.S. Cl. .................... 525/197; 525/210; 525/211; 525/216; 525/232; 525/240; 524/528
(58) Field of Search ................................. 525/197, 210, 525/211, 216, 232, 240; 524/528

(56) References Cited

U.S. PATENT DOCUMENTS

| | | |
|---|---|---|
| 2,956,042 | 10/1960 | Underwood et al. . |
| 3,036,987 | 5/1962 | Ranalli . |
| 3,278,646 | 10/1966 | Lambert . |
| 3,313,754 | 4/1967 | Logan . |
| 3,361,849 | 1/1968 | Cramer et al. . |
| 3,562,790 | 2/1971 | Coover et al. . |
| 3,663,488 | 5/1972 | Kail . |
| 3,666,836 | 5/1972 | John . |
| 3,937,762 | 2/1976 | Nahmias et al. . |
| 4,311,807 | 1/1982 | McCollough, Jr. et al. . |
| 4,354,004 | 10/1982 | Hughes et al. . |
| 4,359,544 | * 11/1982 | Hwo et al. ............... 525/232 |
| 4,508,786 | 4/1985 | Ishibashi et al. . |
| 4,578,316 | 3/1986 | Clauson et al. . |
| 4,645,792 | 2/1987 | Chatterjee . |
| 4,663,219 | 5/1987 | Janocha et al. . |
| 4,666,989 | 5/1987 | McCollough, Jr. et al. . |
| 4,786,533 | 11/1988 | Crass et al. . |
| 4,842,187 | 6/1989 | Janocha et al. . |
| 4,886,849 | 12/1989 | Hwo et al. . |
| 4,927,885 | 5/1990 | Hayashida et al. . |
| 5,026,778 | 6/1991 | Fujii et al. . |
| 5,128,183 | 7/1992 | Buzio . |
| 5,213,744 | 5/1993 | Bossaert . |

FOREIGN PATENT DOCUMENTS

| | | |
|---|---|---|
| 3514398 | 10/1986 | (DE) . |
| 288227 | 10/1988 | (EP) . |
| 317276A2 | 5/1989 | (EP) . |
| 317276B1 | 5/1989 | (EP) . |
| 441027 | 8/1991 | (EP) . |
| 57-125047 | 8/1982 | (JP) . |
| 59-68215 | 4/1984 | (JP) . |
| 60-210647 | 10/1985 | (JP) . |
| 6197416 | 5/1986 | (JP) . |
| 2-104716 | 4/1990 | (JP) . |
| 6-345909 | 12/1994 | (JP) . |
| 98/31744 | 7/1998 | (WO) . |

OTHER PUBLICATIONS

"The Hercules Spectrum of Hydrocarbon Resin" (1995), Hercules Inc. Resin Div., Wilmington, Del.
Derwent Abstract WPI Accession No. 84–136269.
Derwent Abstract WPI Accession No. 86–101541.
Clippeleir, "Polypropylene modified with Polybutylene: Properties and Markets", Polypropylene '97, 6th Annual World Congress, Zurich Switzerland (1997).
Whelan, "Polymer Technology Dictionary", Champman & Hall, New York, pp 274 (1994).
M.L. Miller, "The Structure of Polymers", Reinhold Publishing Corp., New York, pp 515–519 (1966).
Derwent English abstract WPI Acc No: 95–070419/10.
Derwent English abstract WPI Acc No: 90–161451/21.
Derwent English abstract WPI Acc No: 86–165262/26.
Derwent English abstract WPI Acc No: 82–77321E/37.
Derwent English abstract WPI Acc No: 80–90922C/51.
Z. Bartczak et al., "Primary Spherulite Nucleation in Polypropylene–based Blends and Copolymers", *Poly–propylene: Structure, Blends and Composites*, pp. 25–49 (1995).
Blom et al., *Journal of Applied Polymer Science*, vol. 58, pp. 995–1006 (1995).
Z. Bartczak et al., *Polymer*, vol. 27 (Apr. 1986), pp. 537–543.

\* cited by examiner

Primary Examiner—Donald R. Wilson
(74) Attorney, Agent, or Firm—E. J. Boshears; B. J. Graves

(57) ABSTRACT

Masterbatches comprising high density polyethylene (HDPE) are used for the production of polyolefin articles, particularly films. Employing HDPE in a masterbatch alone or in combination with a hydrocarbon resin and/or a polyolefin ultimately results in extruded polyolefin articles of optimal stiffness and ductility. Employing a high density polyethylene in combination with a hydrocarbon resin and a polyolefin in a masterbatch causes the masterbatch to solidify more rapidly and be pelletized more efficiently.

28 Claims, No Drawings

COMPOSITIONS, PROCESSES FOR MAKING, AND ARTICLES OF POLYOLEFINS, HIGH DENSITY POLYETHYLENE AND HYDROCARBON RESIN

CROSS-REFERENCE TO RELATED APPLICATIONS

This application is a divisional of application Ser. No. 08/618,756, filed Mar. 20, 1996, now U.S. Pat. No. 6,087,446. The entire disclosure of application Ser. No. 08/618,756 is considered as being part of the disclosure of this application, and the entire disclosure of application Ser. No. 08/618,756 is expressly incorporated by reference herein in its entirety.

BACKGROUND OF THE INVENTION

1. Field of the Invention

This invention relates to masterbatches and their method of use for producing polyolefin articles, particularly films. High density polyethylene can be incorporated into the masterbatch alone or in combination with a hydrocarbon resin and/or a polyolefin and when used in combination with a hydrocarbon resin causes the masterbatch to solidify more rapidly and be pelletized more efficiently (improved compounding efficiency). These masterbatches ultimately result in extruded polyolefin articles, such as cast polypropylene films, of optimal stiffness and ductility.

2. Discussion of Background

Polyolefins are plastic materials useful for making a wide variety of valued products due to their combination of stiffness, ductility, barrier properties, temperature resistance, optical properties, availability, and low cost. Being a semi-crystalline polymer, a number of these important properties such as stiffness, barrier properties, temperature resistance, and optical properties, depend on the ability of the polyolefin to crystallize in the most effective manner, and to the desired degree.

The process for forming a polyolefin product strongly affects the crystallization behavior of the material and its ultimate properties. For instance, when polypropylene is cast into thin film, the polymer cools so quickly that the ultimate level of crystallinity is reduced by this "quenching" process, and correspondingly the stiffness of the film is reduced. Cast polypropylene films typically exhibit a stiffness, measured as tensile modulus, of nominally 100 Kpsi. Highly oriented polypropylene (OPP) films typically-exhibit modulus values 2–4 times higher than the values for cast polypropylene film while non-oriented thick molded articles typically exhibit modulus values nominally 50% to 100% higher then cast polypropylene film. Also when making cast film, it is important that the polypropylene melt solidify quickly to promote high production rates, and also that the crystalline regions which are formed are not so large in size that they confer haze to the film.

Other molded polyolefin articles, particularly thin gauge products made by thermoforming, injection molding, or blow molding, are subject to similar constraints. Faster crystallization which permits rapid demolding and stiffer products is desired, as well as good optical properties promoted by small crystalline domain size.

As a means for improving the stiffness of polyolefins, the addition of a high softening point hydrocarbon resin to polyolefins, such as polypropylene, is known. The composition of the hydrocarbon resin must be such that it exhibits a significantly higher glass transition temperature (Tg) than the amorphous regions of the polypropylene (Tg around $-10°$ C.), and the hydrocarbon resin must be highly compatible in the polypropylene. It is believed that the effect of the hydrocarbon resin is to increase the Tg of the amorphous polypropylene fraction and by doing so increase its tensile modulus at temperatures below 38° C.

The hydrocarbon resins described above are friable solids which exhibit very low melt viscosity at the temperatures normally used to process polyolefin. An effective way to blend hydrocarbon resin into polyolefin is in a separate compounding step prior to the final use of the blend. It is difficult to incorporate hydrocarbon resin into polypropylene during an actual conversion step (for example film casting, sheet extrusion, etc.) because of the hydrocarbon resins dusting characteristics and low melt viscosity. A more effective way to incorporate hydrocarbon resin into polyolefin during the conversion step is to add the resin in concentrate form as a mixture of resin with polyolefin. U.S. Pat. No. 5,213,744 describes a process of forming a concentrate consisting of a simple binary mixture of hydrocarbon resin and polyolefin, and using this concentrate as a more effective way of incorporating hydrocarbon resin into a polyolefin film formulation at a level of 5 wt. % to 30 wt. %.

Although the stiffening caused by adding hydrocarbon resin is desirable, it can be achieved only by adding high levels of hydrocarbon resin (typically at or above 5 wt. %) to the total polyolefin formulation, and only if the softening point of the hydrocarbon resin is 100° C. or higher, the stiffening effect increases as the hydrocarbon resin content and softening point increase. While the stiffening effect caused by the addition of hydrocarbon resin to polyolefins, is desirable, adding high levels of resin (e.g., above 5 wt. %), has a negative impact on ductility and results in increased formulation cost. Therefore, it would be highly desirable to enhance polyolefin stiffness by addition of hydrocarbon resin to the polypropylene at levels below 5 wt. % and preferably below 3 wt. %.

SUMMARY OF THE INVENTION

Before further discussion, a definition of the following terms will aid in the understanding of the present invention.

Masterbatch—a mixture of 2 or more ingredients which simplifies adding these ingredients to a material as a blend, rather than as a plurality of individual ingredients. In the present case masterbatch is defined as a blend of one or more ingredients (additives) in the proper proportion by weight with a polymer or mixture of polymers, where the total formulation is ultimately added to a second polymer, which is either the same or different than the polymer or mixture of polymers which comprise the masterbatch, as the means of incorporating the additives into the second polymer.

Additive—An additive is typically a substance added to a polymer which is non-polymeric in nature, or if it is polymeric in nature is substantially different in type and character from the polymer to which it is added. In the present case, additive refers to both the hydrocarbon resin and high density polyethylene (HDPE) which are ultimately blended with polyolefin. By our definition, HDPE is considered an additive although it could also be considered a polymer in the context of the masterbatch definition.

Polyolefin Blend—the final formulation resulting from the combination of a masterbatch with a polyolefin polymer or mixture of polymers. Accordingly, the polyolefin polymer or polymers into which the masterbatch is included is termed the blend polyolefin.

Hydrocarbon Resin—refers to low molecular weight resin products of about 10,000 number average molecular weight (Mn) or less derived from polymerizing feedstocks from the coal or petrochemical industries, resin products derived from terpene, rosin, or other feedstocks. This term will not be used to refer to high molecular weight polymer products of about 50,000 number average molecular weight or more.

As discussed above, adding a high softening point hydrocarbon resin to a polyolefin, such as polypropylene, will increase the glass transition temperature (Tg) of the amorphous phase of the polyolefin and modify its properties. One effect of hydrocarbon resin addition is greater stiffness. However to achieve significant property modification the hydrocarbon resin must be added at levels at or above 5 wt. % of the total polyolefin blend. Adding high levels of hydrocarbon resin has a negative impact on ductility and impact properties, increases formulation cost, and slows down the crystallization rate of the polyolefin. It would therefore be desirable to achieve the favorable effects of hydrocarbon resin addition at lower hydrocarbon resin add levels.

The present inventor has discovered that adding low levels of high density polyethylene (HDPE) to a polyolefin, such as polypropylene, accelerates the crystallization rate of the polyolefin when the high density polyethylene (HDPE) is adequately dispersed into the polyolefin and the ingredients are effectively added. It appears that under fast cooling conditions the HDPE crystallizes faster than the polyolefin and as the HDPE begins to crystallize it acts as a nucleator for subsequent crystallization of the polyolefin.

Accordingly, the present invention is directed to masterbatches for modifying polyolefins in which the masterbatch is a combination of a hydrocarbon resin and a high density polyethylene (HDPE) mixed with a polyolefin polymer, or a binary mixture of HDPE with a polyolefin, or a binary mixture of a high density polyethylene and a hydrocarbon resin. The masterbatch components should be intimately combined utilizing conventional techniques such as; dry blending, extrusion mixing and melt blending and pelletizing. In a preferred embodiment, the masterbatch is provided in pellet form by melt blending and pelletizing the masterbatch components.

Adding HDPE and hydrocarbon resin to a polyolefin polymer as a masterbatch prior to extrusion of the article results in favorable characteristics in the final article.

Additionally, the present inventor has discovered that adding low levels of HDPE to a polyolefin, as a masterbatch, without the hydrocarbon resin, gives desirable property modifications to the finished product.

In each case, the ingredients and proportion by weight of the ingredients in the masterbatch are such that they become intimately mixed into a formulation during the final processing step to make a final article.

In an embodiment of the present invention the masterbatch for modifying polyolefin polymers comprises about 10–90 wt % high density polyethylene and a hydrocarbon resin alone or in combination with a polyolefin. The polyolefin may be present in a concentration of up to about 85 wt. % of the total masterbatch and can be any $\alpha$ olefin polymer comprised of monomers containing from about 2 to 8 carbon atoms with propylene polymers being most preferred. The polyolefin may be an ethylene polymer with a density up to about 0.930 g/cm$^3$.

In a preferred embodiment, the polyolefin is selected from the group consisting of polypropylene and polymers of polypropylene with up to about 20 wt. % of monomers selected from the group consisting of ethylene and $C_4$ to $C_8$ mono $\alpha$ olefin.

The polyolefin in the masterbatch is selected to be similar to the blend polymer, or if significantly different from the blend polymer, to be present in low levels in the masterbatch so that it is incorporated at low levels (less than 5 wt. %) in the final blend.

The hydrocarbon resin and high density polyethylene may be present at a combined concentration of about 15 wt. % to 100 wt. % of the total masterbatch, and the hydrocarbon resin and high density polyethylene may be in a relative proportion by weight of between about 0:1 to 10:1 in the masterbatch, provided the concentration of high density polyethylene never exceeds about 40 wt. % of the total masterbatch unless the weight ratio of hydrocarbon resin to high density polyethylene in the masterbatch is at least about 0.5:1 or greater.

In a preferred embodiment of the masterbatch, the high density polyethylene has a density greater than about 0.935 g/cm$^3$ and a melt index greater than about 1.0 g/10 min, while the hydrocarbon resin is an aliphatic compatible resin of number average molecular weight of 10,000 or less with an odorless mineral spirit (OMS) cloud point of less than about 0° C. and a ring and ball softening point of 100° C. or above (obtained through use of ASTM 28-67). In another masterbatch embodiment, the hydrocarbon resin is an aliphatic compatible resin having an OMS cloud point of less than about −40° C.

Odorless mineral spirit (OMS) cloud point was determined through the following test. Ten (10 wt. %) weight percent of a resin is placed in a test tube containing ninety (90 wt. %) weight percent of an odorless mineral spirit (OMS) which is Shell-Sol 71 (available from Shell Chemical Company, Houston, Tex.). The test tube containing the sample is heated until a clear solution is formed. The solution is then cooled until turbidity of the solution is observed. The onset of turbidity is recorded as the initial cloud point. Cooling of the solution is continued until the solution is completely turbid. The final cloud point is the point at which total turbidity is observed.

In additional embodiments of the masterbatch, the high density polyethylene can have a density greater than about 0.950 g/cm$^3$ or a density greater than about 0.960 g/cm$^3$ and a melt index greater than about 5.0 g/10 min or greater than about 10.0 g/10 min, respectively. In a preferred masterbatch embodiment, the high density polyethylene has a density of about 0.950 g/cm$^3$ or greater and a melt index between about 10–30 g/10 min.

In a preferred embodiment, the masterbatch may comprise a hydrocarbon resin and a high density polyethylene in a proportion by weight of hydrocarbon resin to high density polyethylene of about 0.5:1 to 4:1.

In a most preferred embodiment, the masterbatch composition comprises a polypropylene, for example polypropylene homopolymer, as the polyolefin.

In another preferred embodiment, the masterbatch for modifying polyolefin polymers comprises about 5 to 50 wt % high density polyethylene, about 30 to 60 wt % hydrocarbon resin and about 10 to 45 wt % polypropylene. In another preferred embodiment, the masterbatch for modifying polyolefin polymers comprises about 5 to 25 wt % high density polyethylene, about 40 to 60 wt % hydrocarbon resin and about 25 to 45 wt % polypropylene. For example, a masterbatch for modifying polyolefin polymers may comprise about 15 wt % high density polyethylene, about 50 wt % hydrocarbon resin and about 35 wt % polypropylene. In a most preferred embodiment, the masterbatch for modifying polyolefin polymers comprises about 40 wt % high density polyethylene, about 40 wt % hydrocarbon resin and about 20 wt % polypropylene.

In yet another embodiment, the masterbatch for modifying polyolefin polymers comprises about 15 to 50 wt % high density polyethylene and about 50 to 85 wt % polypropylene. Preferred embodiments include about 40 or 50 wt % high density polyethylene and about 50 or 60 wt % polypropylene. In a most preferred embodiment, the masterbatch for modifying polyolefin polymers comprises about 30 wt % high density polyethylene and about 70 wt % polypropylene.

The present invention is also directed to modified polyolefin blend compositions which result from blending the ingredients of the masterbatch described above into a polyolefin polymer using conventional equipment such as a twin-screw extruder.

Accordingly, in another embodiment of the present invention, a modified polyolefin composition is comprised of a polyolefin, about 0.3 wt. % to about 4.0 wt. % of a high density polyethylene and up to about 5 wt. % of a hydrocarbon resin. In the modified polyolefin composition, various polyolefins can be utilized, for example a polymer comprised of a mono-alpha olefin containing from about 2 to 8 carbon atoms, with propylene polymers being preferred. The polyolefin may be an ethylene polymer with a density less than about 0.930 g/cm$^3$. In a preferred embodiment, the polyolefin is selected from the group consisting of polypropylene and polymers of polypropylene with up to about 20 wt. % of monomers selected from the group consisting of ethylene and $C_4$ to $C_8$ mono $\alpha$ olefin.

Accordingly, in another embodiment of the present invention, a modified polyolefin composition is comprised of about 99.7 wt. % to about 91 wt. % of a polyolefin, such as polypropylene, about 0.3 wt. % to about 4.0 wt. % of a high density polyethylene and up to about 5 wt. % of a hydrocarbon resin. In the modified polyolefin composition, various polyolefins can be utilized, for example a polymer comprised of a mono-alpha olefin containing from about 2 to 8 carbon atoms, with propylene polymers being preferred. The polyolefin may be an ethylene polymer with a density less than about 0.930 g/cm$^3$. In a preferred embodiment, the polyolefin is selected from the group consisting of polypropylene and polymers of polypropylene with up to about 20 wt. % of monomers selected from the group consisting of ethylene and $C_4$ to $C_8$ mono $\alpha$ olefin.

In another preferred embodiment of the modified polyolefin blend composition, the modified polyolefin composition comprises about 1.5 wt. % to about 2.5 wt. % of a high density polyethylene and about 2 wt. % to 3.5 wt. % of a hydrocarbon resin, wherein the polyolefin comprises polypropylene.

In the modified polyolefin composition, it is preferred that the hydrocarbon resin is an aliphatic compatible resin with Mn of 10,000 or less having an odorless mineral spirit (OMS) cloud point of less than 0° C. and a ring and ball softening point of 100° C. or above. Additionally, the modified polyolefin composition may comprise an aliphatic compatible hydrocarbon having an odorless mineral spirit (OMS) cloud point of less than −40° C.

In a most preferred embodiment, the modified polyolefin composition comprises a polypropylene homopolymer as the polyolefin modified by a masterbatch comprising a hydrocarbon resin and a HDPE. It is further preferred that the polyolefin composition be modified by combining about 6% of a masterbatch comprised of hydrocarbon resin and HDPE with the blend polyolefin. The modification of the polyolefin by the addition of low levels of hydrocarbon resin and HDPE achieves several-enhanced properties.

First, the addition of low levels of hydrocarbon resin and HDPE increases the tensile modulus value of the polyolefin by 15% to 70% above the value of the polyolefin polymer itself. More typically, increases of 20% to 50% are achieved by this modification. A principle, but not exclusive, use for formulations of this type is in cast film where higher stiffness is a desirable quality.

Secondly, modified polypropylene blends altered in this manner realize improved crystallization behavior where the blend will solidify (crystallize) from the melt faster and/or in a different manner than the unmodified polypropylene. This effect is important in many fabrication processes such as film production, blow molding, injection molding, and sheet thermoforming where productivity and optical quality depend on the speed and nature of the crystallization process. Accordingly, the modified blends are useful for forming various articles such as film, fibers, bottles, molded articles and sheets.

Finally, with regard to the modified polypropylene blend, the addition of the hydrocarbon resin and HDPE modifiers does not deteriorate the optical properties of the blend, and in many instances improves optical quality. Thin (1–4 mils thick) cast films made from these modified polypropylene formulations demonstrate excellent clarity, low haze values (less than 5% as measured by ASTM D-1003), and also high 45° gloss values of 70% to 90% (measured by ASTM D-2457). This last effect was especially unexpected. Intuitively it is expected that adding HDPE to polypropylene will increase haze substantially and lead to surface roughness and poor gloss. However, good optical properties are retained or improved by the incorporation of low levels of an effective grade of a high density polyethylene if it is intimately dispersed in the final polypropylene blend in accordance with the present invention.

Additional aspects of the present invention are directed to the process and resulting polyolefin articles formed from polymer blend compositions resulting from mixing a masterbatch as described above into a polyolefin and the subsequent blending and extrusion of the modified polyolefin to form a polyolefin article.

Accordingly, the present invention is directed to a process for producing a polyolefin article comprising providing a masterbatch may comprise about 10–90 wt % high density polyethylene and at least one member selected from the group consisting of polyolefin and hydrocarbon resin. The polyolefin may be present at a concentration of up to about 85 wt. % of the total masterbatch and various polyolefins can be utilized, for example a polymer comprising mono-alpha olefin monomers containing from about 2 to 8 carbon atoms with propylene polymers being preferred. The polyolefin may be an ethylene polymer with a density up to about 0.930 g/cm$^3$. In a preferred embodiment, the polyolefin is selected from the group consisting of polypropylene and polymers of polypropylene with up to about 20 wt. % of monomers selected from the group consisting of ethylene and $C_4$ to $C_8$ mono $\alpha$ olefin.

The hydrocarbon resin and high density polyethylene may be present in at a concentration of about 15 wt. % to 100 wt. % of the total masterbatch, and the hydrocarbon resin and high density polyethylene may be present in a proportion by weight of about 0:1 to 10:1 in the masterbatch, provided the concentration of high density polyethylene never exceeds about 40 wt. % of the total masterbatch mixture unless the weight ratio of hydrocarbon resin to high density polyethylene in the masterbatch is at least about 0.5:1 or greater. The masterbatch is preferably melt blended and pelletized. The masterbatch is subsequently mixed with polyolefin to form a polyolefin blend which is then extruded to form a polyolefin article.

In an embodiment of the present invention, the polyolefin blend extruded to form the polyolefin article comprises about 2 wt. % to 25 wt. % of the masterbatch, with about 4 wt. % to 10 wt. % of the masterbatch being preferred, and additionally comprises about 0.3 wt % to 4.0 wt. % high density polyethylene and up to about 5 wt. % hydrocarbon resin. It is also preferred that the polyolefin blend comprises about 6% of the masterbatch.

In another preferred embodiment of the present method, the high density polyethylene has a density greater than 0.935 g/cm$^3$ and a melt index greater than 1.0 g/10 min. and the hydrocarbon resin is an aliphatic compatible resin with a number average molecular weight 10,000 or less with an odorless mineral spirit (OMS) cloud point of less than 0° C. and a ring and ball softening point of 100° C. or above.

In a further embodiment of the present process, the masterbatch comprises a hydrocarbon resin and a high density polyethylene in a proportion by weight of hydrocarbon resin to high density polyethylene of about 0.5:1 to 4:1.

In still another preferred embodiment of the present method, the masterbatch comprises about 4 wt. % to 10 wt. % of the polyolefin blend, with about 6 wt. % being most preferred.

In a further preferred method embodiment, the polyolefin blend comprises about 1.5 wt. % to 2.5 wt. % high density polyethylene and about 2 wt. % to 3.5 wt. % hydrocarbon resin.

In a most preferred process embodiment, the polyolefin polymer comprises polypropylene, such as a polypropylene homopolymer, in the masterbatch and the final polyolefin blend.

In a preferred embodiment of the process, the masterbatch comprises about 5 to 50 wt % high density polyethylene, about 30 to 60 wt % hydrocarbon resin and about 10 to 45 wt % polypropylene and the polyolefin in the polyolefin blend comprises polypropylene. In another preferred embodiment, the masterbatch comprises about 15 wt % high density polyethylene, about 50 wt % hydrocarbon resin and about 35 wt % polypropylene and the polyolefin in the polyolefin blend comprises polypropylene. In a most preferred embodiment, the masterbatch comprises about 40 wt % high density polyethylene, about 40 wt % hydrocarbon resin and about 20 wt % polypropylene and the polyolefin in the polyolefin blend comprises polypropylene.

In a further preferred embodiment of the process, the masterbatch comprises about 15 to 50 wt % high density polyethylene and about 50 to 85 wt % polypropylene and the polyolefin in the polyolefin blend comprises polypropylene. In a preferred embodiment the masterbatch comprises about 40 or 50 wt % high density polyethylene and about 50 or 60 wt % polypropylene. In a most preferred embodiment, the masterbatch comprises about 30 wt % high density polyethylene and about 70 wt % polypropylene and the polyolefin in the polyolefin blend comprises polypropylene.

In another embodiment of the present invention, polyolefin articles are produced according to the above method. Polypropylene articles which are cooled very quickly, such as cast film, benefit from an additive which enhances stiffness by increasing the crystallization level in the film. Likewise other thin molded articles, where optical properties and stiffness are important attributes, benefit from an additive which favorably affects the crystallization process and also enhances product stiffness. Accordingly, polyolefin articles which benefit from the composition and methods of the present invention include, blow molded polypropylene products, thermoformable polypropylene sheet products and polypropylene fiber products.

In another embodiment the extruded polyolefin article is a film which comprises a high density polyethylene and at least one member selected from the group consisting of polyolefin and hydrocarbon resin. For example, the film may comprise high density polyethylene, polyolefin and hydrocarbon resin or a high density polyethylene and polypropylene.

The polyolefin in the film may comprise a polymer comprising mono-alpha olefin monomers containing about 2 to 8 carbon atoms. In a preferred embodiment, the polyolefin comprises polypropylene.

DETAILED DESCRIPTION OF THE INVENTION

In the first aspect of the present invention, there are provided masterbatches comprising a polyolefin and a high density polyethylene; a hydrocarbon resin and a high density polyethylene and a combination of a polyolefin, a high density polyethylene and a hydrocarbon resin, in which the components of the masterbatch are present in amounts effective to increase the stiffness of the final polyolefin containing article. Preferably, the masterbatch formulation is used in polypropylene applications, such as in cast polypropylene films, but is not exclusively limited to this area. The masterbatch must be mixable with the polyolefin prior to the processing step and be uniformly mixed into the final product (e.g. cast film) by being homogenized into the product during the processing (typically extrusion) step.

Hydrocarbon resins suitable for use as additives in the masterbatch are aliphatic compatible products derived from rosin, terpene, or hydrocarbon feedstocks having a ring and ball (R&B) softening point of 70° C. or above. These hydrocarbon resins have a number average molecular weight (Mn) as measured by vapor phase osmometry below the molecular weight of the polyolefin. Suitable hydrocarbon resins have a number average molecular weight less than 10,000, with hydrocarbon resins of Mn less than 5,000 being preferred, for example hydrocarbon resins of at least about 500 to 2000 Mn. Hydrocarbon resins include aliphatic compatible resins with an odorless mineral spirit (OMS) cloud point of less than 0° C., but preferably less than −40° C., and with a R&B softening point of 100° C. or above, with fully hydrogenated terpene or hydrocarbon resins having a softening point of about 120° C. or higher being preferred and those with a R&B softening point of between about 135° C. and 160° C. being most preferred. Examples of preferred hydrocarbon resins include REGALITE® R-125 Resin, REGALREZ® 1139 Resin, and REGALREZ® 1128 Resin, which are hydrogenated resins with a R&B softening point of above 120° C., all of which are available from Hercules Incorporated.

The most preferred hydrocarbon resin for use in this application are fully hydrogenated hydrocarbon resins with a R&B softening point greater than 135° C. For example, REGALREZ® 1139 hydrocarbon resin (available from Hercules Incorporated) is a low molecular weight hydrogenated hydrocarbon resin which exhibits a high Tg (around 90° C.) and is highly compatible with aliphatic polymers. Other similar hydrocarbon resins exhibiting low molecular weight, aliphatic compatibility, and high softening point can also be used with similar effectiveness such as those hydrocarbon resins described in U.S. Pat. No. 5,213,744, the disclosure of which is hereby incorporated by reference in its entirety.

When utilized in a masterbatch, the hydrocarbon resin is believed to act as a "diluent" which compatibilizes the mixture of the two dissimilar polymers. The hydrocarbon resin also acts to reduce the melt viscosity of a polymer masterbatch, which improves the ability to thoroughly disperse the ingredients of the masterbatch into the final blend. When added to polypropylene, the hydrocarbon resin associates with the amorphous phase of the polyolefin and raises the Tg of the polyolefin amorphous phase and ultimately its modulus.

High density polyethylene polymers suitable as additives for the masterbatch are those having a density greater than about 0.935 g/cm$^3$. Preferably the density should be greater than about 0.950 g/cm$^3$, with the most preferred HDPE having a density of about 0.960 g/cm$^3$ or greater. The % crystallinity of the HDPE increases with increasing density, and thus density is a coarse measure of the ability of the HDPE to initiate crystallization.

The effectiveness of HDPE is dependent on achieving a thorough and finely dispersed distribution of HDPE throughout the final polyolefin blend. As a result, the effectiveness of the HDPE is dependent on the degree of dispersion of the HDPE in the masterbatch, combined with the effectiveness of the masterbatch in dispersing the HDPE throughout the polyolefin blend.

In order to be effectively dispersed in the masterbatch formulation, the molecular weight (MW) of the HDPE should be suitably low. Melt index (MI) (ASTM D-1238, 190° C. and 2.16 Kg. load) is a good indicator of relative molecular weight and flow. HDPE grades effective in this application should have a MI greater than about 1.0 g/10 min., and preferably above about 5.0 g/10 min. Most preferred are grades of HDPE with a MI greater than about 10 g/10 min. For example, an effective grade of HDPE is a grade having a MI value between about 10–30 g/10 min. (190° C., 2.16 Kg.) and a density of 0.950 g/cm$^3$ or greater. HDPE having a lower MW and higher flow is desirable because both factors make it easier to disperse HDPE throughout the polyolefin in finer and more numerous domains. However if the MI is too high, the meet fluidity can be excessive and hinder effective dispersion of the HDPE into the polyolefin. HDPE with the highest density displays the fastest and most complete crystallization behavior. HDPE which exhibits a strong affinity to crystallize is desirable. A highly effective HDPE for use in this invention is ALATHON H6611 polymer (from Lyondell Petrochemical Company) which has an MI of 11.0 g/10 min. and a density of 0.965 g/cm$^3$.

Although not being restricted to a particular mechanism, it is believed that the function of the HDPE in the masterbatch formulation is to modify the crystallization behavior of the polyolefin, preferably homo-polypropylene. The HDPE does not function as a bulk alloying ingredient, which is its function in conventional applications but rather behaves like a nucleator; an agent which can accelerate the crystallization rate or change the crystallization behavior of a material, even when used at very low levels.

Desirable masterbatch compositions contain additive concentrations which incorporate sufficient quantities of high density polyethylene polymer in conjunction with a hydrocarbon resin and/or a polyolefin to achieve desired blend compositions with enhanced properties. In the masterbatch formulation both the high softening point hydrocarbon resin and the HDPE are considered active ingredients or additives. The concentration of active ingredients in the masterbatch can range from 5 wt. % to 100 wt. %. The preferred range of active ingredients is from 50 wt. % to 100 wt. %. Accordingly in one embodiment, the additives are present in the masterbatch at a level of about 15 wt. % to 80 wt. % while the polyolefin is about 20 wt. % to 85 wt. %. In a preferred embodiment, the additives are present at about 15 wt. % to 100 wt % while polyolefin levels of the masterbatch are about 0 wt. % to 85 wt. %. In another embodiment, additives in the masterbatch are present at about 80 wt. %, while the masterbatch levels of the polyolefin is about 20 wt. %.

The acceptable proportion by weight of hydrocarbon resin and HDPE which will give the required property modification, range from a hydrocarbon resin/HDPE weight ratio of 0/1 (no resin added, 100% HDPE as the active agent) to a weight ratio of 10/1. The preferred range of compositions is between a hydrocarbon resin/HDPE weight ratio of about 0.5/1 to 4/1. In the masterbatch formulation the concentration of HDPE should never exceed 40 wt. % of the total mixture unless the weight ratio of hydrocarbon resin/HDPE is 0.5/1 or greater.

In the masterbatch formulation, various polyolefins can be utilized, for example a polymer comprised of mono-alpha olefin monomers containing about 2 to 8 carbon atoms, with propylene polymers being preferred. The polyolefin may be an ethylene polymer with a density less than about 0.930 g/cm$^3$. In a preferred embodiment, the polyolefin is selected from the group consisting of polypropylene and polymers of polypropylene with up to about 20 wt. % of monomers selected from the group consisting of ethylene and $C_4$ to $C_8$ mono α olefin. Accordingly, the polyolefin polymer may comprise a homopolymer of a $C_2$ to $C_8$ olefin or a copolymer of two or more $C_3$ to $C_8$ olefins, including but not limited to, propylene, butene-1, hexene and 4-methyl pentene-1. The present invention can also employ a random copolymer of ethylene and propylene such as an isotactic propylene-ethylene copolymer with a density of from 0.86 to 0.92 g/cm$^3$ as measured at 23° C. according to ASTM D1505 and a melt flow index of from 2 to 15 g/10 min as determined according to ASTM D1238 (conditions at 230° C. and 2.16 kg.). The propylene copolymers may be synthesized by employing conventional polymerization methods employing catalysts such as $AlCl_3$ and $TiCl_4$. Polyolefins that fit within the above definition are described in U.S. Pat. No. 5,213,744, which is hereby incorporated by reference in its entirety. The polyolefin portion of the masterbatch is selected to be similar to the polymer to which the melt blend will be added, or if significantly different, to be present at amounts in the masterbatch so that it is present at levels below 5 wt. % in the polymer article.

With respect to masterbatch formulations used for film applications, various grades of polypropylene polymer are preferred, for example a high molecular weight stereoregular semi-crystalline polypropylene. If stiffer cast polypropylene film is desired, the use of polypropylene homopolymer is most preferred. Polypropylene melt flow rates (230° C., 2.16 Kg. load) of from about 0.5–50 g/10 min. can be utilized in the present invention, with between 2–10 g/10 min. being preferred and a MFR of between about 2.0–5.0 g/10 min being the most preferred.

The melt flow rate (MFR) of the masterbatch and the MFR of the polyolefin blend polymer help to determine the efficiency with which the masterbatch is distributed into the polyolefin. If the polyolefin blend polymer exhibits a low MFR, the masterbatch will be best distributed if it also exhibits a MFR typically between about 2× and 20× the value of the polyolefin polymer. If the blend polymer has a higher MFR, then a masterbatch formulation with a MFR higher than the previous case is desirable, again nominally 2× to 20× the MFR of the polyolefin polymer into which the masterbatch will be combined.

The masterbatch formulations of this invention can be used to produce ranges of polyolefin blend compositions containing high density polyethylenes alone or in combination with a hydrocarbon resin which exhibit enhanced mechanical and optical properties. These polyolefin compositions can be particularly useful in cast film applications.

The polyolefin blend should incorporate the necessary additives at masterbatch add levels between about 2 wt. % to 25 wt. %, with about 4 wt. % to 10 wt. % being preferred and between about 4 wt. % to 8 wt. % being most preferred.

The polyolefin blend polymer in the final polymer formulation comprises any grade of polymer or blend of polymers as described above for the masterbatch, which can be altered to the described degree by the modifiers (e.g., hydrocarbon resin and HDPE) present in the masterbatches. For example, the polyolefins employed in the final blend used to make the extruded product, for example a film, may be selected from one of the above mentioned polyolefins recited as being suitable in the masterbatch. Although the polyolefin used in the masterbatch and the polyolefin used in the blend may indeed differ, it is preferred that they be similar. In a most preferred embodiment, the present invention is directed to a final polymer formulation comprising polypropylene polymer modified by the addition of masterbatches containing low levels of HDPE alone or in conjunction with a hydrocarbon resin. The resulting polyolefin blend exhibits improved properties compared to the properties of the polyolefin polymer alone. In a most preferred embodiment, the formulations are comprised of a polypropylene modified by melt blending with low levels of hydrocarbon resin and HDPE. The final blend exhibits any or all of the following properties, A) Modulus values which are 15% to 70% greater than the value of the unmodified polypropylene polymer, B) Superior crystallization behavior, and C) Haze values comparable to or better than the unmodified polypropylene.

Polypropylene homopolymer is most effectively modified by the additives described above and is preferred in cast film application of this invention. In cast films, polypropylene homopolymer having a MFR of 2–10 g/10 min. (230° C., 2.16 Kg.) is preferred. A typical MFR for polypropylene homopolymer used in cast film applications, for which this invention is particularly directed, is nominally 7 g/10 min.

At hydrocarbon resin add levels of 5 wt. % or more, the hydrocarbon resin would have adverse effects on ductility and impact properties. Because of this latter constraint, it is preferred that the hydrocarbon resin be incorporated into the final polyolefin (e.g. polypropylene) formulation at hydrocarbon levels of from about 0 wt. % to about 5 wt. %, but preferably at levels of about 2 wt. % to about 3.5 wt. % of the final propylene blend.

While it is known that high softening point hydrocarbon resins added to polyolefins, preferably polypropylene, can increase the modulus of the polyolefin, the present inventor has discovered that combining low levels of HDPE with low levels of hydrocarbon resin is an even more effective way to stiffen polyolefins such as polypropylene. While investigating this issue, it was surprisingly learned that the addition of low levels of HDPE alone to polyolefins can also substantially stiffen the polyolefin. It is indeed surprising that the above-recited low levels of HDPE added to polyolefin realizes a significant improvement in the mechanical properties of the polyolefin as demonstrated in the examples below where the addition of between 0.7 wt. % to 3 wt. % HDPE (more preferably 1.5 wt. % to 2.5 wt. % HDPE) to polypropylene increased the tensile modulus of the material by 20 to 50%. Low HDPE add levels are therefore preferred because at higher HDPE levels the enhancement in polyolefin properties is lost and/or other negative attributes caused by the presence of HDPE are observed.

In the instant invention the HDPE can be incorporated into the modified polypropylene formulation at a level ranging from about 0.3 wt. % to about 4.0 wt. %, with HDPE addition of about 0.7 wt. % to about 3.0 wt. % being preferred and an HDPE addition of from about 1.5 wt. % to about 2.5 wt. % being most preferred. At lower HDPE levels (e.g. below 0.3 wt. %) it is difficult to reproducibly affect the mechanical properties of the polypropylene formulation even when good dispersion exists. At higher levels (e.g., above 4 wt. %) the domain size of the HDPE increases with increasing add levels, causing an increase in haze and a decrease in ductility.

Accordingly, a most preferred embodiment is directed to the incorporation into a polypropylene polymer of about 2.0 wt. % to about 3.5 wt. % of high softening point hydrocarbon resin along with the required low level of HDPE, which is preferably added at about 0.7 wt. % to about 3.0 wt. % level. Additionally, the properties of polypropylene polymers can also be substantially enhanced by mixing low levels of HDPE into the polypropylene, typically at levels between about 0.7 wt. % to 3.0 wt. %, exclusive of the use of the hydrocarbon resin.

The present invention will be further illustrated by way of the following Examples.

EXAMPLES 1–3

In Comparative Examples 1 and 1B, a 50/50 mixture comprising REGALREZ® 1139 hydrocarbon resin, manufactured by Hercules Incorporated, and HIMONT PD-403 polypropylene homopolymer (obtained from Himont Incorporated) was compounded using a BRABENDER D-6 model twin-screw extruder which contain two counter rotating intermeshing twin screws which are run at approximately 100 RPM. The temperature of the extruder at feed is approximately 150° C. and the temperature of the extruder at the nozzle is approximately 220° C. The extruder is run under starve feeding conditions in order to maximize residence time in the extruder. Under these conditions, the sample was mixed in the extruder for approximately 2 to 5 minutes in order to completely melt and homogenize both components before subsequently being pelletized.

In Example 2 a mixture of Regalrez® 1139 hydrocarbon resin (50%) combined with PD 403 Polypropylene from Exxon Chemical (35%) and ALATHON M6210 HDPE from Lyondell (15%) was dry blended and subsequently melt homogenized and pelletized using a twin-screw extruder in the same fashion as in Example 1.

In Example 3 a 70/30 mixture of PD 403 Polypropylene and ALATHON M-6210 HDPE was likewise compounded as in Examples 1 and 2. In Example 1B, a masterbatch was made according to the process of Example 1 except that the polypropylene used was ESCORENE 4292 Polypropylene which was a 2.0 MFR grade of polypropylene manufactured by Exxon Chemical.

Each product described in Examples 1–3 was ultimately extruded as a strand into a 2 foot long water bath to solidify the melt before pelletization. It was noted that the high level of REGALREZ® 1139 hydrocarbon resin in Example 1 slowed down the crystallization/solidification process such that the strand was not rigid enough to chop cleanly until 40 seconds time elapsed after exiting the chill bath. In Example 2 the presence of the HDPE accelerated the solidification process such that the strand was rigid and could be cleanly chopped 20 seconds after exiting the cooling bath. In Example 3, containing no hydrocarbon resin, the strand was rigid enough to pelletize immediately after exiting the cooling bath.

| Example | RR 1139 Resin Content | HDPE Content | Strand Velocity (ft/sec.) | Required Strand Length (Cooling Bath-Pelletizer) | Required Solidification Time (Pelletizer-Cooling Bath) |
|---|---|---|---|---|---|
| 1, 1B (comp.) | 50% | — | 15 | 10 ft. | 40 sec. |
| 2 | " | 15% M6210 | " | 5 ft. | 20 sec. |
| 3 | " | 30% M6210 | " | 0 ft. | 0 sec. |

The slow solidification of Comparative Examples 1 and 1B made it difficult to efficiently convert this mixture into pellet form. The faster solidification caused by the addition of the ALATHON M-6210 HDPE in Example 2 made the process more efficient.

EXAMPLES 4–7

In Example 4, a cast film sample was prepared by extruding ESCORENE 4193 cast film grade polypropylene available from Exxon Chemical Corporation having a MFR of 7.5 g./10 min. through a 6" wide film die using a ¾" Brabender single screw extruder. The molten polymer was cast onto a metal chill roll cooled with 40° C. water and drawn down to a 1.5 mil thickness by adjusting the surface velocity of the casting rolls relative to the extrusion rate of the polymer.

In Example 5 a 94/6 mixture of ESCORENE 4193 PP combined with 6% of the REGALREZ® 1139 concentrate of Example 1 was extruded into 1.5 mil cast film under identical conditions used to prepare the films of Example 4. In this and subsequent Examples blending of the additives from the concentrate into the polypropylene matrix is accomplished during the film extrusion step.

In Example 6, similar films were produced where a compound containing 6% of the [REGALREZ 1139+ HDPE] concentrate of Example 2 was extruded into film under the same conditions as Examples 4 and 5.

In Example 7, cast films were prepared under conditions identical to the previous Examples where a 94/6 mixture of Escorene 4193 with the concentrate of Example 3 being used. The tensile properties of each of the film samples of Examples 4–7 were measured as listed in the table below.

| | Additive | % RR-1139 | % HDPE | Haze (%) | Yield Stress (Kpsi) MD/TD | Tensile Modulus (Kpsi) MD/TD |
|---|---|---|---|---|---|---|
| Example 4 (comp.) | — | — | — | 5.7 | 3.04/3.13 | 102/114 |
| Example 5 (comp.) | 6% .1 | 3 | — | 5.7 | 3.40/3.07 | 129/121 |
| Example 6 | 6% .2 | 3 | 0.9 | 8.2 | 3.63/3.49 | 135/135 |
| Example 7 | 6% .3 | — | 1.8 | — | HDPE Gels | HDPE Gels |

The films of Example 5 containing REGALREZ 1139 hydrocarbon resin exhibited higher stiffness (tensile modulus) and higher MD yield stress than the films prepared in Example 4 containing no hydrocarbon resin additive. Comparable films of Example 6 containing a low level of ALATHON M-6210 HDPE in addition to the REGALREZ 1139 exhibited even higher yield stress and modulus values than the films of Example 5 containing no HDPE. The films made according to Example 7 were very poor in quality because of poor dispersion of the HDPE from the Example 3 masterbatch throughout the Polypropylene matrix. The films were of poor quality and exhibited poor ductility in the transverse direction.

In Example 6, the presence of low levels of HDPE increased effectiveness of REGALREZ 1139 hydrocarbon resin in increasing the stiffness of the cast film. By itself, HDPE had no desirable effect because it could not be homogeneously dispersed into the polypropylene during the film casting step.

EXAMPLES 8–13

In Example 8 (comparative), cast films were made from Escorene 4292 polypropylene available from Exxon Corporation having a nominal MFR of 2.0 g./10 min. The films were made similar to the procedure in Example 4, using a casting roll was cooled with 40° C. water, with the exception that the casting roll speed and extrusion rate was adjusted to produce films 3 mils thick.

In Example 9 (comparative), cast film samples were made according to the procedure used in Example 8 except that the polymer feed was a 94/6 mixture of ESCORENE 4292 polypropylene combined with the masterbatch of Example 1, such that the final film contained 3% REGALREZ 1139 hydrocarbon resin.

In Example 10, films were made in the same fashion as the previous Examples with the exception that the polymer feed was a 94/6 mixture of ESCORENE 4292 polypropylene and the masterbatch described by Example 2, where the final film contained 3% REGALREZ 1139 and 0.9% ALATHON M6210 HDPE.

The tensile properties of these films were measured in both machine and transverse direction as listed in the table below. By comparing the values, it can be seen that presence of HDPE in Example 10 increased both the tensile modulus and yield strength of the cast films as compared to both the unmodified polypropylene film (Example 8) and the film containing REGALREZ 1139 but no HDPE (Example 9).

In Example 11 (comparative), cast polypropylene film was made in the same fashion as Example 8 except that the casting roll speed was increased to reduce the film thickness to 1.5 mil.

In Example 12 (comparative), cast film 1.5 mil thick was made similar to Example 11 except that the polymer composition was identical to that in Example 9, the film containing 3% REGALREZ 1139.

Likewise in Example 13, similar 1.5 mil film was made using the polymer blend used in Example 10 where the final film contained 3t REGALREZ 1139 and 0.9% ALATHON M6210 HDPE.

Tensile properties of the films produced are listed in the table below. Comparing Examples 8 to 13, the tensile modulus of the thin films was not increased to the same degree as the modulus of the thicker films by the addition of either REGALREZ 1139 resin or resin combined with ALATHON M6210 HDPE. Example 12 compared to Example 13 demonstrates no additional effect on tensile modulus from addition of HDPE along with REGALREZ 1139 resin.

|  | Addi-tive | Film Thick-ness | % RR-1139 | % HDPE | Tensile Modulus (Kpsi) MD/TD | Yield Stress (Kpsi) MD/TD |
|---|---|---|---|---|---|---|
| Example 8 (comp.) | — | 3.2 mils | — | — | 112/112 | 3.02/2.88 |
| Example 9 (comp.) | 6% .1 | 3.3 mils | 3 | — | 117/120 | 2.89/2.79 |
| Example 10 | 6% .2 | 3.0 mils | 3 | 0.9 | 141/128 | 3.39/3.11 |
| Example 11 (comp.) | — | 1.5 mil | — | — | 98/99 | 2.75/2.67 |
| Example 12 (comp.) | 6% .1 | 1.6 mil | 3 | — | 103/107 | 2.73/2.66 |
| Example 13 | 6% .2 | 1.7 mil | 3 | 0.9 | 108/110 | 2.67/2.64 |

Comparing Examples 8–13, it is seen that for each polymer composition reducing the film thickness decreased the tensile modulus of the ultimate film. As the film thickness is reduced, the polymer melt is cooled faster and crystallization is forced to occur at lower temperatures. This effect impedes the ability of the polymer to crystallize which leads to lower modulus values in the thin cast films.

It was noted that the higher modulus values observed for films containing both REGALREZ 1139 hydrocarbon resin and ALATHON M6210 HDPE could only be developed under limited conditions of film thickness combined with casting roll temperature. Reducing film thickness or lowering the casting roll temperature both have the effect of impeding the ability of the polymer to crystallize from the melt, and both conditions greatly reduced effectiveness of low levels of ALATHON M6210 HDPE for modifying the mechanical properties of cast polypropylene film. The synergistic effect from adding HDPE along with hydrocarbon resin to cast polypropylene film formulations appears related to the effect of the HDPE on the crystallization of the polypropylene during the film casting step. This effect is not achieved by generic addition of low levels of HDPE into the formulation. The desired effect is affected by the type of HDPE added, the degree of dispersion of the HDPE into the polymer melt, and the crystallization conditions during the film casting step. It is highly desirable to use a [Hydrocarbon resin+HDPE] masterbatch formulation which is much less sensitive to film casting conditions than the formulation of Example 2.

EXAMPLES 14–17

In Example 14, a blend consisting of [506 REGALREZ 1139 hydrocarbon resin+15% ALATHON H6611 HDPE (Lyondell)+35% ESCORENE 4292 PP] was melt compounded and extruded into pellet form in the same fashion as the concentrate products of Examples 1 and 2.

In Example 15, a similar concentrate blend was made except that ALATHON H5121 was the HDPE type added at a 15% level.

Example 16, was a similar masterbatch containing 12.5% ALATHON H5234 HDPE while in Example 17 the masterbatch contained 12.5% Alathon H5618 HDPE. Blends represented by Examples 14 to 17 exhibited faster solidification of the extruded strand than the blend without HDPE, represented by Example 1, and both could be pelletized more efficiently. These types of HDPE are injection molding grades of polymer, and differ from the M6210 grade of Example 2 as described below.

| Example | REGALREZ 1139 Content | HDPE Content | HDPE Melt Ind (ASTM D-1238) | HDPE Density (g/cm³) |
|---|---|---|---|---|
| 2 | 50% | 15% Alathon M6210 | 1.0 | 0.962 |
| 14 | " | 15% Alathon H6611 | 11.0 | 0.966 |
| 15 | " | 15% Alathon H5112 | 12.0 | 0.951 |
| 16 | " | 12.5% Alathon H5234 | 34.0 | 0.952 |
| 17 | " | 12.5% Alathon H5618 | 18.0 | 0.956 |

M6210 grade is a higher MW extrusion grade HDPE. The higher MW can negatively affect the ability of the polymer to be uniformly dispersed in a blend and it can slow the crystallization of the dispersed HDPE in such a blend under fast cooling conditions as when thin cast films are made.

EXAMPLES 18–25

In Example 18 (comparative), a 2 mil thick cast film was prepared from ESCORENE 4292 polypropylene in the same manner as the films of Examples 4 to 7 by casting the melt onto casting rolls cooled by 50° C. water.

In Example 19 (comparative), a film was prepared in a similar manner as Example 18 from a blend of ESCORENE 4292 PP with 7% of the 50% REGALREZ 1139 hydrocarbon resin concentrate described in Example 1B.

In Example 20, a cast PP film was prepared according to Example 18 from ESCORENE 4292 PP with 7% of the masterbatch of Example 14, containing 50% REGALREZ 1139+15% ALATHON H661 HDPE.

In Example 21, a similar film was prepared from a blend of ESCORENE 4292 PP with 76 of the masterbatch of Example 15 containing 50% REGALREZ 1139+15% ALATHON H5112 HDPE. Tensile properties of these cast films were measured as listed in the table below. It can be noted that the films containing REGALREZ 1139 hydrocarbon resin exhibited significantly higher tensile modulus while the films made from the masterbatches containing ALATHON H6611 or H5112 HDPE in addition to REGALREZ 1139 hydrocarbon resin exhibited even higher modulus values along with higher tensile yield stress values.

In Examples 22 to 25 cast films were prepared in an identical fashion as the films of Examples 18 to 21 except that the water to the casting roll was 40° C. instead of 50° C. The tensile properties of these films were measured and compared to the values of the previous Examples in the table below. The lower casting roll temperature causes the treated melt to crystallize at a lower temperature and reduces the ultimate level of crystallinity. This effect in turn leads to lower tensile modulus and yield stress values as measured in Examples 22 to 25. In Example 24, containing ALATHON H 6611 HDPE in addition to 3.5% REGALREZ 1139, the cast film retained the highest modulus and yield stress values while the film of Example 25, containing ALATHON H5112 HDPE, exhibited somewhat lower values. The film of Comparative Example 23 containing 3.5% REGALREZ 1139 with no added HDPE, exhibited a smaller increase in tensile modulus and yield stress relative to film made from 100% ESCORENE 4292 PP (Comparative Example 22) than the films additionally containing HDPE. In these previous Examples the addition of REGALREZ 1139 stiffened up the cast polypropylene films, while the films additionally containing 1.05% HDPE were even stiffer. The influence of the HDPE is likely a synergistic effect on the crystallization of the polypropylene during the film casting step. Alathon H6611 which is a highly crystalline HDPE (0.966 density) was particularly effective in this application.

| Example | Additive | Cast Temp. | Film Gauge | % RR-1139 | % HDPE | Haze (%) | Modulus (Kpsi) MD/TD | Yield Stress (Kpsi) MD/TD |
|---|---|---|---|---|---|---|---|---|
| 18 (comp.) | — | 50° C. | 1.9 mil | — | — | 7.8 | 106/112 | 2.98/3.00 |
| 19 (comp.) | 7% . 1B | " | 2.0 | 3.5 | — | 6.9 | 127/125 | 3.19/3.07 |
| 20 | 7% . 14 | " | 1.6 | 3.5 | 1.05 | 5.9 | 133/138 | 3.42/3.48 |
| 21 | 7% . 15 | " | 1.9 | 3.5 | 1.05 | 5.5 | 136/134 | 3.46/3.38 |
| 22 (comp.) | — | 40° C. | 2.0 | — | — | 4.3 | 100/98 | 2.76/2.64 |
| 23 (comp.) | 7% . 1B | " | 1.9 | 3.5 | — | 2.4 | 113/115 | 2.93/2.80 |
| 24 | 7% . 14 | " | 2.0 | 3.5 | 1.05 | 2.5 | 133/133 | 3.34/3.21 |
| 25 | 7% . 15 | " | 2.0 | 3.5 | 1.05 | 2.6 | 120/120 | 3.10/3.08 |

EXAMPLES 26–33

In Examples 26 to 29 cast PP films were made according to the procedure of Examples 18 to 21 except that Amoco 82-6721Y polypropylene was used and the casting roll water was 35° C.

In Examples 30 to 33 cast PP films were made according to the previous four examples except that the casting roll water was increased to 42° C. The 82-6721Y polypropylene is a 7.5 g./10 min. MFR grade made by Amoco for cast PP film applications. Properties measured for these films are listed in the table below.

| Example | Additive | Cast Temp. | Film Gauge (ml) | % RR-1139 | % HDPE | Haze/Gloss (%) | Modulus (Kpsi) MD/TD | Yield Stress (Kpsi) MD/TD |
|---|---|---|---|---|---|---|---|---|
| 26 (comp.) | — | 35° C. | 1.9 | — | — | 3.8/77 | 112/111 | 2.83/2.83 |
| 27 (comp.) | 7% . 1B | " | 1.8 | 3.5 | — | 3.0/80 | 115/124 | 2.92/2.97 |
| 28 | 7% . 14 | " | 1.8 | 3.5 | 1.05 | 5.1/81 | 144/143 | 3.36/3.38 |
| 29 | 7% . 15 | " | 1.8 | 3.5 | 1.05 | 4.6/82 | 137/138 | 3.21/3.27 |
| 30 (comp.) | — | 42° C. | 2.0 | — | — | 6.1/71 | 113/111 | 2.93/2.93 |
| 31 (comp.) | 7% . 1B | " | 2.0 | 3.5 | — | 5.7/70 | 124/126 | 3.06/3.11 |
| 32 | 7% . 14 | " | 1.7 | 3.5 | 1.05 | 4.6/81 | 151/148 | 3.62/3.59 |
| 33 | 7% . 15 | " | 1.7 | 3.5 | 1.05 | 4.8/79 | 139/140 | 3.43/3.36 |

The cast PP films containing only REGALREZ 1139 additive exhibited marginally higher yield stress and modulus values, while the films additionally containing 1.05% HDPE exhibited significantly higher values. Again ALATHON H6611 grade HDPE with a 0.966 density was particularly effective in combination with REGALREZ 1139 hydrocarbon resin for stiffening the cast PP film.

EXAMPLES 34–43

In Example 34 (comparative), a cast PP film was produced from Amoco 82-6721Y polypropylene in a manner similar to Example 26 except that the casting roll water was set at 28° C.

In Example 35 (comparative), a film was made as in Example 34 except that 7% of the REGALREZ 1139 masterbatch of Example 1B was blended with the polypropylene.

In Example 36, a film was made similar to the previous Example where the masterbatch added is described by Example 14, containing ALATHON H6611 HDPE in addition to the REGALREZ 1139.

In Example 37, a film was made similar to the previous Examples where the masterbatch added is described by Example 16, containing 12.5% ALATHON H5234 HDPE in addition to the REGALREZ 1139.

In Example 38, a film was made similar to the previous Examples where the masterbatch added is described by Example 17, containing 12.5% ALATHON H5618 HDPE in addition to the REGALREZ 1139.

In Examples 39 to 43 cast PP films were prepared in the same fashion as the films of Examples 34 to 38 except that the temperature of the cooling water to the casting roll was increased to 50° C. The tensile properties of the films prepared in these Examples are listed in the table below.

| Example | Additive | Cast Temp. | Film Gauge (mil) | % RR-1139 | % HDPE | Haze/Gloss as (%) | Modulus (Kpsi) MD/TD | Yield Stress (Kpsi) MD/TD |
|---|---|---|---|---|---|---|---|---|
| 34 (comp.) | — | 28° C. | 1.3 | — | — | 1.2/85 | 102/105 | 2.69/2.58 |
| 35 (comp.) | 7% . 1B | " | 1.7 | 3.5 | — | 0.9/90 | 124/121 | 3.08/3.01 |
| 36 | 7% . 14 | " | 1.7 | 3.5 | 1.05 | 4.4/81 | 134/130 | 3.29/3.20 |
| 37 | 7% . 17 | " | 1.5 | 3.5 | 1.05 | 3.4/79 | 132/137 | 3.30/3.27 |
| 38 | 7% . 18 | " | 1.5 | 3.5 | 1.05 | 3.2/82 | 126/132 | 3.14/3.06 |
| 39 (comp.) | — | 50° C. | 1.5 | — | — | 10.5/44 | 124/125 | 3.17/3.16 |
| 40 (comp.) | 7% . 1B | " | 1.9 | 3.5 | — | 13.0/60 | 135/137 | 3.34/3.26 |
| 41 | 7% . 14 | " | 1.7 | 3.5 | 1.05 | 4.2/79 | 179/169 | 4.16/4.05 |
| 42 | 7% . 17 | " | 1.5 | 3.5 | 1.05 | 3.3/83 | 158/158 | 3.82/3.66 |
| 43 | 7% . 18 | " | 1.5 | 3.5 | 1.05 | 3.8/79 | 175/165 | 4.09/3.89 |

As noted in previous Examples, adding REGALREZ 1139 hydrocarbon resin to the polypropylene formulation increased the stiffness of the cast PP films prepared from the mixture, and incorporating low levels of HDPE synergistically increased the stiffness even further. Various grades of HDPE were used in Examples 34 to 43 to modify the mechanical properties of cast PP films with good effect under a range of film casting conditions. The HDPE materials were injection molding grades with lower molecular weight which allowed them to be more easily distributed into the polypropylene formulation, and allowed the material to crystallize more readily under fast cooling conditions. It is important that the HDPE incorporated in the hydrocarbon resin masterbatch can modify the properties of cast polypropylene film even when the film gauge is thin or the casting temperature is at the low end of typical film casting conditions.

EXAMPLES 44–46

In Example 44 a REGALREZ 1139 masterbatch formulation consisting of 40% REGALREZ 1139 hydrocarbon resin+20% ALATHON H6611 HDPE+40% ESCORENE 4292 PP was melt blended and pelletized in the fashion described in Examples 14 to 17.

In Example 45 a similar masterbatch containing 40% REGALREZ 1139 hydrocarbon resin+40% ALATHON H6611 HDPE+20% ESCORENE 4292 PP was prepared.

In Example 46 a masterbatch was prepared similar to Examples 45 and 46 by combining 30% ALATHON H6611 HDPE with 70% ESCORENE 4292 PP.

It was noted that masterbatch formulations containing high levels of hydrocarbon resin solidified slowly due to the slower crystallization rate of the blends containing the amorphous resin. It was likewise noted that adding HDPE to these hydrocarbon resin masterbatch formulations caused the molten blend to solidify and stiffen up faster, allowing the masterbatches containing HDPE to be pelletized more efficiently during compounding. This effect is related to the effect of the HDPE on the crystallization rate of the hydrocarbon resin masterbatch formulations. The crystallization properties of several REGALREZ 1139 and HDPE masterbatch formulations in polypropylene were measured by differential scanning calorimetry (DSC) where the polymer blends were cooled from the melt at 25° C./minute down to ambient temperatures, the total heat of crystallization and peak crystallization temperature being measured by this method. The DSC crystallization properties of several REGALREZ 1139 masterbatch formulations with or without additional HDPE are listed in the table below.

| Example | REGALREZ 1139 Content (%) | HDPE Content | Heat of Crystallization (Joules/g) | Peak Crystallization Temperature (° C.) |
|---|---|---|---|---|
| Alathon H6611 | — | 100% | 192.8 | 105.5 |
| Alathon H5112 | — | 100% | 141.5 | 106.8 |
| Eacorene 4292 PP | — | — | 80.7 | 102.4 |
| 1 (comp.) | 50 | — | 42.3 | 91.8 |
| 14 | 50 | 15% | 59.9 | 97.9 |
| 15 | 50 | 15% | 54.8 | 92.7 |
| — | 40 | — | 49.6 | 95.3 |
| 45 | 40 | 40% | 92.6 | 112.6 |
| — | 40 | 60% | 110.8 | 110.8 |

Compared to polypropylene, HDPE exhibits a higher heat of crystallization and faster crystallization. The faster crystallization rate is indicated by the smaller degree of cooling below the peak melting point of the polymer required for crystallization to occur in HDPE as compared to PP. In the REGALREZ 1139 masterbatches, those formulations containing HDPE in addition to REGALREZ 1139 hydrocarbon resin exhibited both a higher crystallization temperature and a higher heat of crystallization. Both effects contribute to the faster rate at which the HDPE modified hydrocarbon resin masterbatches crystallizes to the degree of stiffness needed to allow the material to be effectively pelletized.

EXAMPLES 47–54

In Example 47 (comparative), a cast film sample was prepared from Amoco 10-6711 cast film grade polypropylene (7.5 g./10 min. MFR) according to the procedure used in Examples 4 to 7. In this Example the cooling water to the casting rolls during film preparation was held at 40° C.

In Example 48, a film was prepared in an identical manner to Example 47 except that 6% of the masterbatch of Example 44 was added to the Amoco 10-6711 PP.

In Example 49, a cast film was prepared in a manner identical to the previous two Examples except that 6% of the masterbatch material of Example 45 was added to the polypropylene.

In Example 50, cast film was produced in the same manner as the previous three examples except the 6% of the masterbatch of Example 46 was added.

In Examples 51 to 54 cast Polypropylene films were produced in an identical manner to the films of Examples 47 to 50 except that ESCORENE 4292 was the polypropylene grade used. Composition and tensile properties for these film samples are listed in the table below.

| Example | Additive | PP Type | Film Gauge (mil) | % RR-1139 | % HDPE | Haze/Gloss as (%) | Modulus (Kpsi) MD/TD | Yield Stress (Kpsi) MD/TD |
|---|---|---|---|---|---|---|---|---|
| 47 (comp.) | — | Amoco 10-6711 | 1.5 | — | — | 4.3/76 | 108/110 | 2.82/2.93 |
| 48 | 6% 44 | Amoco 10-6711 | 1.5 | 2.4 | 1.2 | 5.4/78 | 122/122 | 3.18/3.21 |
| 49 | 6% .45 | Amoco 10-6711 | 1.5 | 2.4 | 2.4 | 4.4/78 | 147/159 | 3.84/4.05 |
| 50 | 6% .46 | Amoco 10-6711 | 1.5 | — | 1.8 | 6.1/77 | 110/115 | 3.00/3.03 |
| 51 comp.) | — | Escorene 4292 | 1.5 | — | — | 3.6/73 | 105/99 | 2.87/2.79 |
| 52 | 6% 44 | Escorene 4292 | 1.6 | 2.4 | 1.2 | 2.6/85 | 129/136 | 3.38/3.41 |
| 53 | 6% .45 | Escorene 4292 | 1.5 | 2.4 | 2.4 | 2.7/83 | 118/134 | 3.27/3.39 |
| 54 | 6% .46 | Escorene 4292 | 1.5 | — | 1.8 | 3.0/76 | 134/129 | 3.65/3.49 |

In cast film grade Amoco 10-6711 polypropylene the masterbatch of Example 45 which added an equal amount of REGALREZ 1139 hydrocarbon resin and ALATHON H6611 HDPE to the cast PP film composition was most effective in increasing the stiffness of the film. In the low MFR ESCORENE 4292 polymer the masterbatch of Example 46, containing H6611 HDPE but no hydrocarbon resin, was as effective as the [REGALREZ 1139+HDPE] masterbatches for increasing the modulus of the cast PP film.

In these and all previous Examples the hydrocarbon resin and HDPE were blended into the polypropylene polymer during the extrusion of the polymer in the film casting process. To achieve the desired effect on mechanical properties, both hydrocarbon resin and HDPE must be properly dispersed in the masterbatch, and a satisfactory viscosity match between the masterbatch and polypropylene polymer exist to permit the masterbatch components to be satisfactorily dispersed into the polypropylene polymer during the film extrusion process. For this reason the molecular weight or MFR of the HDPE polymer is an important factor as is the MFR of the [Hydrocarbon resin+HDPE] masterbatch. Comparing the Examples in the previous table it is noted that adding the masterbatch containing H6111 HDPE without REGALREZ 1139 hydrocarbon resin was more effective for increasing the stiffness of the lower MFR ESCORENE 4292 polymer (Example 54) than the same masterbatch in the higher MFR Amoco polymer (Example 50). In the higher MFR Amoco polymer the masterbatch compositions containing both REGALREZ 1139 hydrocarbon resin and HDPE were most effective for increasing stiffness (Examples 48 and 49), the masterbatch containing H6611 HDPE without REGALREZ 1139 hydrocarbon resin being only marginally effective (Example 50). In these Examples the hydrocarbon resin substantially increased the MFR of the masterbatch formulation. This effect is important because an important factor in the ultimate effectiveness of the masterbatch is the proper viscosity match between the masterbatch and the polypropylene polymer being modified which affects the ultimate distribution of the additives into the film.

The enhanced stiffness of cast PP films modified with low levels of HDPE may result from the faster crystallizing HDPE in turn accelerating the crystallization rate of the PP in the modified formulation. When cast film is made the cooling rate is very rapid, and the polymer can be quenched to a temperature low enough to prevent further crystallization before the desired level of crystallinity is developed.

Faster crystallization translates into a higher crystallinity level and higher modulus in the final cast PP film. The crystallization properties of polypropylene formulations modified with the [Hydrocarbon resin+HDPE] masterbatches of this invention can be measured by differential scanning calorimetry (DSC). Several modified PP formulations were analyzed by DSC where the materials were cooled from the melt to ambient temperatures at a 25° C./min. rate while the heat of crystallization and peak crystallization temperature were measured. Crystallization properties of several PP formulations modified with ALATHON H6611 HDPE with or without additional REGALREZ 1139 hydrocarbon resin are listed in the table below.

| Example | Polypropylene Type | REGALREZ 1139 Content (%) | HDPE Content | Heat of Crystallization (Joules/g) | Peak Crystallization Temperature (° C.) |
|---|---|---|---|---|---|
| 47 | Amoco 10-6711 | — | — | 88.4 | 107.6 |
| 49 | " | 2.4 | 2.4% | 90.0 | 112.1 |
| 50 | " | — | 1.8% | 91.6 | 111.4 |
| 51 | Escorene 4292 | — | — | 76.6 | 108.0 |
| 53 | " | 2.4 | 2.4% | 82.0 | 112.9 |
| 54 | " | — | 1.8% | 82.6 | 112.1 |

Normally adding hydrocarbon resin to polypropylene reduces the peak crystallization temperature and reduces the heat of crystallization by the same percentage amount as the % of amorphous resin added. In the Examples listed in the previous table the hydrocarbon resin modified formulations containing ALATHON H661 HDPE exhibited both a higher heat of crystallization and higher peak crystallization temperature. Likewise polypropylene formulations modified with only H6611 HDPE exhibited the same effect. This effect can facilitate the development of higher levels of crystallinity in cast PP films where the ultimate crystallization level is strongly influenced by the rapid cooling occurring during the film casting process.

EXAMPLES 55–58

In Example 55, a cast Polypropylene film was prepared from HD642H polypropylene, a cast film grade of polymer manufactured by Borealis, (Copenhagen, Denmark). The film was cast according to the procedure of Example 4 where the polymer was extruded onto a chill roll having a 50° C. surface temperature, and the casting speeds were adjusted to produce cast film nominally 1.5 mils thick. In Example 56 a film was produced in a manner similar to Example 55 except that the polymer feed contained 7% of a REGALREZ 1139 hydrocarbon resin/polypropylene concentrate, made according to Example 1B except that the concentration of REGALREZ 1139 in the blend was reduced from 50% to 40%. In Example 57 a cast PP film was made identical to the previous two Examples except that 7% of the masterbatch of Example 44 was blended with the Borealis polymer. In Example 58 a similar film was made where 7% of the masterbatch of Example 45 was blended with the Borealis polymer.

The tensile properties and barrier properties were measured for these cast films. The composition of each film and its corresponding properties are listed in the table below for comparison.

|  | Example 55 | Example 56 | Example 57 | Example 58 |
|---|---|---|---|---|
| BOREALIS HD642H PP | 100 | 97.2 | 95.8 | 94.4 |
| REGALREZ 1139 resin | — | 2.8 | 2.8 | 2.8 |
| ALATHON H6611 HDPE | — | — | 1.4 | 2.8 |
| MB Type | — | Ex. 1B | Ex. 44 | Ex. 45 |
| Tensile Modulus, kpsi, MD/TD | 109/108 | 126/126 | 146/150 | 154/159 |
| Yield Stress, kpai, MD/TD | 3.07/3.05 | 3.24/3.21 | 3.81/4.06 | 3.92/4.07 |
| Haze (%) | 9.4 | 6.6 | 5.1 | 4.4 |
| 45° Gloss (%) | 58 | 66 | 70 | 73 |
| Moisture Vapor Transmission (g-mil/sq. m-day), 100° F., 90% RH | 9.86 | 9.08 | 7.10 | 6.77 |
| $O_2$ Permeability @ 23° C. (cc-mil/sq. m-day-atm.) | 8840 | 8630 | 6700 | 6730 |

Examples 57 and 58 made with hydrocarbon resin masterbatch compounds additionally containing HDPE exhibited tensile modulus and yield strength substantially higher than for the polypropylene film containing no added hydrocarbon resin, and also substantially higher than the values for the film containing 2.8% REGALREZ 1139 but no HDPE. Likewise the films into which HDPE was incorporated along with REGALREZ 1139 by using masterbatches of Examples 44 and 45 exhibited substantially better moisture and oxygen barrier properties than comparative films containing no HDPE. The novel formulations of this invention provide a means to improve the barrier properties of polypropylene films.

While the invention has been described in connection with certain preferred embodiments so that aspects thereof may be more fully understood and appreciated, it is not intended to limit the invention to these particular embodiments. On the contrary, it is intended to cover all alternatives, modifications and equivalents as may be included within the scope of the invention as defined by the appended claims.

What is claimed is:

1. A process for producing a polypropylene article comprising:
   providing a masterbatch comprising a mixture of high density polyethylene and at least one member selected from the group consisting of polyolefin and hydrocarbon resin having a ring and ball softening point of at least about 70° C., the masterbatch having about 10–90 wt % of high density polyethylene;
   mixing said masterbatch with stereoregular polypropylene to form a polypropylene blend having about 0.3 wt % to 4.0 wt % of the high density polyethylene and from 0 wt % to about 5 wt % of hydrocarbon resin;
   extruding the blend to form the polypropylene article; and wherein the masterbatch is pelletized prior to mixing with the stereoregular polypropylene to form the polypropylene blend.

2. A process for producing a polypropylene article comprising:
   providing a masterbatch comprising a mixture of high density polyethylene and at least one member selected from the group consisting of polyolefin and hydrocarbon resin having a ring and ball softening point of at least about 70° C., the masterbatch having about 10–90 wt % of high density polyethylene;
   mixing said masterbatch with stereoregular polypropylene to form a polypropylene blend having about 0.3 wt % to 4.0 wt % of the high density polyethylene and from 0 wt % to about 5 wt % of hydrocarbon resin;
   extruding the blend to form the polypropylene article; and wherein the masterbatch is melt blended and pelletized prior to mixing with the stereoregular polypropylene to form the polypropylene blend.

3. An article produced by providing a masterbatch comprising a mixture of high density polyethylene and at least one member selected from the group consisting of polyolefin and hydrocarbon resin having a ring and ball softening point of at least about 70° C., the masterbatch having about 10–90 wt % of high density polyethylene;
   mixing said masterbatch with stereoregular polypropylene to form a polypropylene blend having about 0.3 wt % to 4.0 wt % of the high density polyethylene and from 0 wt % to about 5 wt % of hydrocarbon resin;
   extruding the blend to form the article.

4. A film produced by providing a masterbatch comprising a mixture of high density polyethylene and at least one member selected from the group consisting of polyolefin and hydrocarbon resin having a ring and ball softening point of at least about 70° C., the masterbatch having about 10–90 wt % of high density polyethylene;
   mixing said masterbatch with stereoregular polypropylene to form a polypropylene blend having about 0.3 wt % to 4.0 wt % of the high density polyethylene and from 0 wt % to about 5 wt % of hydrocarbon resin;
   extruding the blend to form the film.

5. A modified polyolefin composition comprising:
   a semi-crystalline polyolefin comprising a polymer comprised of alpha-olefin monomers containing about 2 to 8 carbon atoms and about 0.3 wt. % to 4.0 wt. % of a high density polyethylene and from 0 wt. % up to about 5 wt. % of a hydrocarbon resin having a ring and ball softening point of at least 70° C.

6. A modified polyolefin composition according to claim 5, wherein the polyolefin is comprised of alpha-olefin monomers containing about 2 to 8 carbon atoms, provided ethylene polymers have a density of up to about 0.930 g/cm$^3$.

7. A modified polyolefin composition according to claim 6, wherein the polyolefin is selected from the group consisting of polypropylene and polymers of polypropylene with up to about 20 wt. % of monomers selected from the group consisting of ethylene and $C_4$ to $C_8$ mono α olefin.

8. A modified polyolefin composition according to claim 5, wherein said high density polyethylene has a density greater than about 0.935 g/cm$^3$.

9. A modified polyolefin composition according to claim 5, wherein said high density polyethylene has a density greater than about 0.950 g/cm$^3$.

10. A modified polyolefin composition according to claim 9, wherein said high density polyethylene has a density greater than about 0.960 g/cm$^3$.

11. A modified polyolefin composition according to claim 10, wherein said high density polyethylene has a melt index greater than about 1.0 g/10 min.

12. A modified polyolefin composition according to claim 5, wherein the high density polyethylene has a melt index greater than about 5.0 g/10 min.

13. A modified polyolefin composition according to claim 5, wherein the high density polyethylene has a melt index greater than about 10 g/10 min.

14. A modified polyolefin composition according to claim 5, wherein the high density polyethylene has a melt index greater than about 10–30 g/10 min and a density of about 0.950 g/cm$^3$ or greater.

15. A modified polyolefin composition according to claim 5, wherein the high density polyethylene has a melt index greater than about 10–30 g/10 min and a density of about 0.960 g/cm$^3$ or greater.

16. A modified polyolefin composition according to claim 5, wherein the polyolefin comprises polypropylene.

17. A modified polyolefin composition according to claim 5, wherein the modified polyolefin composition comprises about 1.5 wt. % to 2.5 wt. % of a high density polyethylene.

18. A modified polyolefin composition according to claim 5, wherein the polyolefin composition comprises about 2 wt. % to 3.5 wt. % of a hydrocarbon resin.

19. A modified polyolefin composition according to claim 5, wherein the hydrocarbon resin has a number average molecular weight of 10,000 or less.

20. A modified polyolefin composition according to claim 5, wherein the hydrocarbon resin has an odorless mineral spirit (OMS) cloud point of less than 0° C.

21. A modified polyolefin composition according to claim 5, wherein the hydrocarbon resin has an odorless mineral spirit (OMS) cloud point of less than −40° C.

22. A modified polyolefin composition according to claim 5, wherein the hydrocarbon resin has a ring and ball softening point of 100° C. or above.

23. A modified polyolefin composition according to claim 5, wherein the hydrocarbon resin has a number average molecular weight of 10,000 or less, an odorless mineral spirit (OMS) cloud point of less than 0° C., and a ring and ball softening point of 100° C. or above.

24. A modified polyolefin composition according to claim 5, wherein the hydrocarbon resin has a number average molecular weight of 10,000 or less, an odorless mineral spirit (OMS) cloud point of less than −40° C., and a ring and ball softening point of 100° C. or above.

25. A modified polyolefin composition according to claim 5, wherein, the modified polyolefin composition comprises a polypropylene homopolymer as the polyolefin.

26. An article formed from the modified polyolefin composition of claim 5.

27. An article according to claim 26, wherein the formed article is a film, a fiber, a sheet or a bottle.

28. A modified polyolefin composition according to claim 5, wherein the polyolefin comprises polypropylene in an amount of about 99.7 wt. % to about 91 wt. %.

* * * * *